(12) United States Patent
Wu et al.

(10) Patent No.: US 11,240,973 B2
(45) Date of Patent: Feb. 8, 2022

(54) ARTIFICIALLY INTELLIGENT HARVEST AND REUSE SYSTEM FOR PLANTING VEGETABLES

(71) Applicant: SUNPOWER GRAND HOLDINGS PTE. LTD., Taoyuan (TW)

(72) Inventors: Yu-Chien Wu, Taoyuan (TW); Li-Jen Wu, Taoyuan (TW); Hsin-Lan Wu, Taoyuan (TW)

(73) Assignee: Sunpower Grand Holdings Pte. Ltd., Taoyuan (TW)

( * ) Notice: Subject to any disclaimer, the term of this patent is extended or adjusted under 35 U.S.C. 154(b) by 43 days.

(21) Appl. No.: 16/856,231

(22) Filed: Apr. 23, 2020

(65) Prior Publication Data

US 2020/0337249 A1  Oct. 29, 2020

(30) Foreign Application Priority Data

Apr. 26, 2019  (TW) .................................. 108114683

(51) Int. Cl.
   *A01G 9/029*    (2018.01)
   *B65G 47/90*    (2006.01)

(52) U.S. Cl.
   CPC ......... *A01G 9/0299* (2018.02); *A01G 9/0297* (2018.02); *B65G 47/90* (2013.01); *B65G 47/901* (2013.01); *B65G 47/902* (2013.01)

(58) Field of Classification Search
   CPC .... A01D 46/30; A01G 9/0297; A01G 9/0299; B65G 47/90; B65G 47/901; B65G 47/902
   See application file for complete search history.

(56) References Cited

U.S. PATENT DOCUMENTS

| | | | |
|---|---|---|---|
| 2011/0314665 A1* | 12/2011 | Kilibarda | G05B 19/41805 29/783 |
| 2017/0027110 A1* | 2/2017 | Ito | A01G 9/249 |
| 2018/0027747 A1* | 2/2018 | Yoshida | A01G 9/246 |
| 2018/0042192 A1* | 2/2018 | Volpe | A01G 31/02 |
| 2021/0000022 A1* | 1/2021 | Coffin | A01G 31/04 |

* cited by examiner

*Primary Examiner* — Saul Rodriguez
*Assistant Examiner* — Brendan P Tighe
(74) *Attorney, Agent, or Firm* — Rosenberg, Klein & Lee

(57) ABSTRACT

An artificially intelligent harvest and reuse system for planting vegetables has a first mechanic arm moving a plurality of planting plates around a first conveyor, a second conveyor, a first shelf and a second shelf. The planting plates are sent to a connecting conveyor for the grown vegetables thereon to be picked up by a second mechanic arm and further sent to a root cutting apparatus then to a packaging apparatus, while the empty planting plates are further sent to an exit end of the first conveyor and a third mechanic arm places nursery foams with sprouts from a storage area onto the empty planting plates. Then the refilled planting plates are sent back to the corresponding shelf via the second conveyor and placed back into the corresponding layers neatly by the first mechanic arm on a first distributing apparatus.

8 Claims, 15 Drawing Sheets

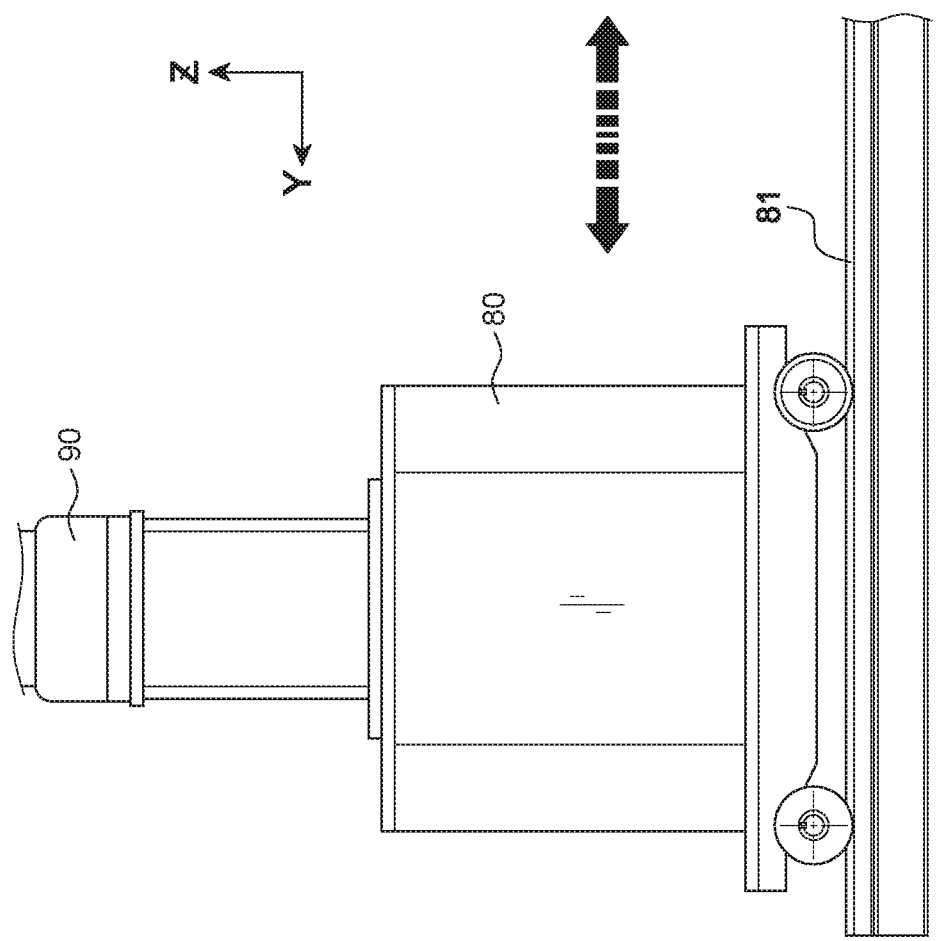

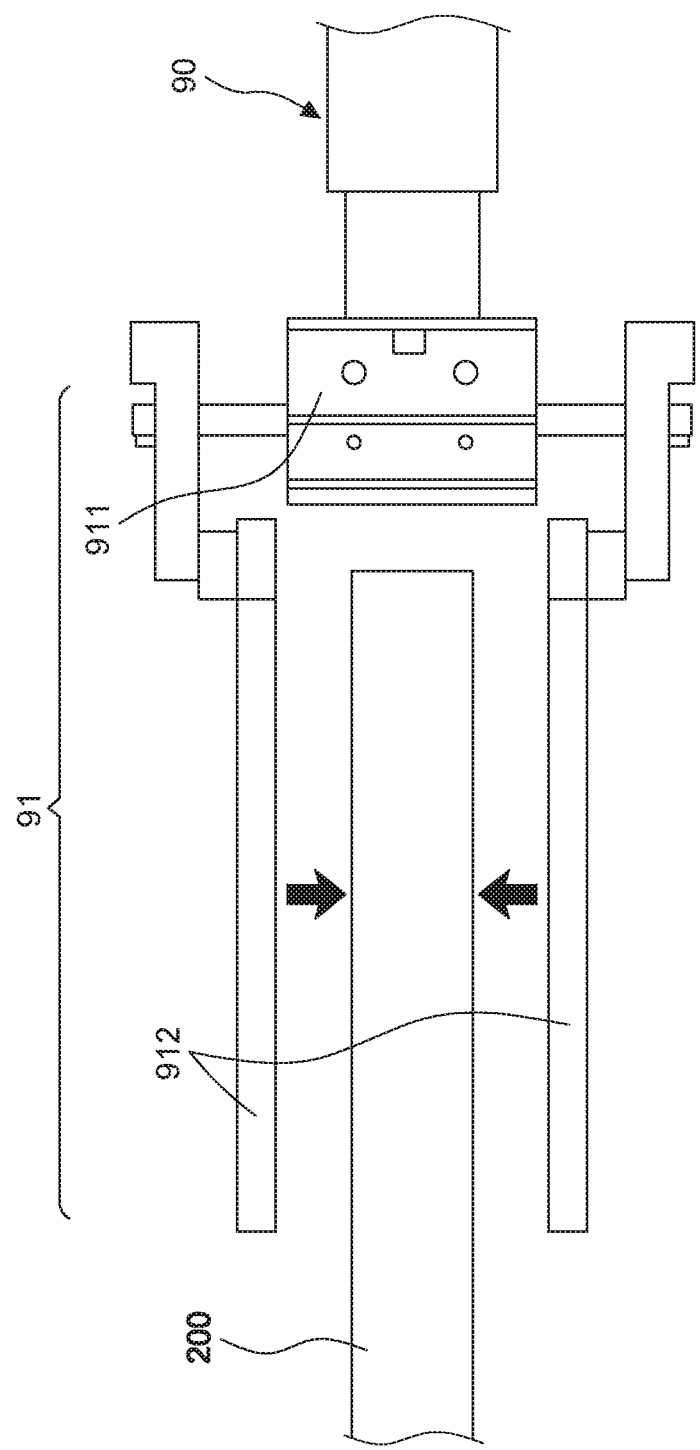

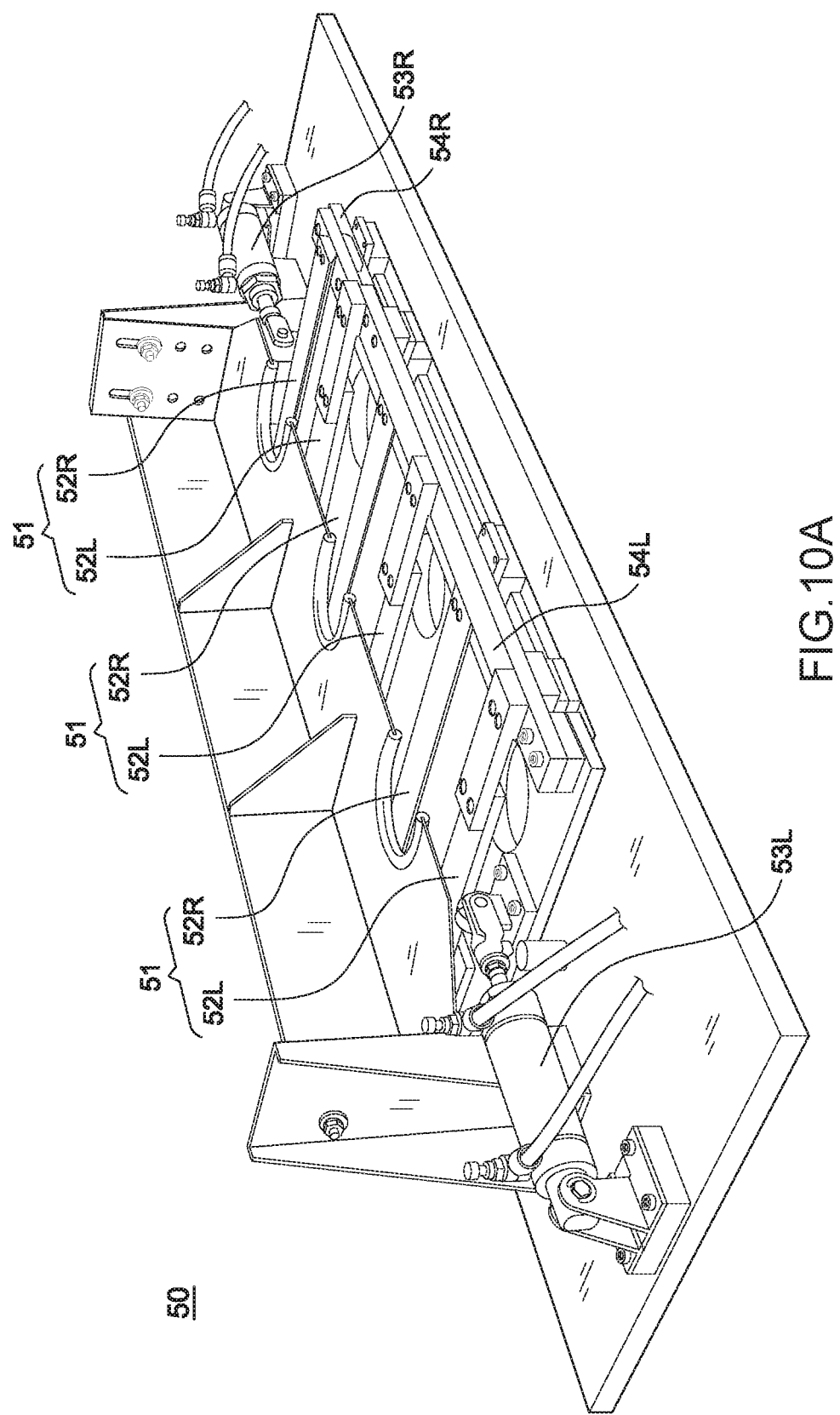

ARTIFICIALLY INTELLIGENT HARVEST AND REUSE SYSTEM FOR PLANTING VEGETABLES

BACKGROUND OF THE INVENTION

1. Field of the Invention

The invention relates to an artificially intelligent harvest and reuse system for planting vegetables, particularly to one that has an operation loop in a U shape for automatically replanting after harvest.

2. Description of the Related Art

Traditionally, cultivation of vegetables is performed on the land and therefore the result of harvest depends on the weather. Then there are greenhouses to lower the impact of bad weather on the vegetables and agricultural plants. However, such greenhouses still cannot really ensure a suitable place for the vegetables to grow. And then there are vegetable factories where the environment is especially designed and arranged for growing vegetables so that the production of vegetables can be maximized continuously. Such vegetable factories are usually built at a location and have shelves with multiple layers stacked and arranged for further increasing the production of the vegetables. But the vegetable factories still require human resources to manually cultivate and gather the vegetables in the process.

FIG. 1 illustrated an automatic harvesting device 50P disclosed in Taiwan Patent No. M52793. The automatic harvesting device has a frame 52, a plurality of sinks 54, a track device 56, a plurality of plates 58 and a mechanical arm system 60P. The sinks 54 are arranged along a first direction X1 on the frame 52 and the track device 56 is disposed on the frame 52 across the sinks 54. The plates 58 are disposed on the frame 52 and arranged along a second direction X2 and the mechanical arm system 60P is disposed at both sides of the track device 56 for taking and placing the plates 58. However, such operation still requires human resources for cultivation and harvest, even for gathering, root cutting and packaging. And each procedure cannot be arranged efficiently with such automatic harvesting system.

SUMMARY OF THE INVENTION

It is a primary objective of the present invention to provide an artificially intelligent harvest and reuse system for planting vegetables that has the planting plates modularized and neatly disposed on the layers thereof for nursery vegetables and has an operation loop in a U shape for repeated operation of harvesting and planting vegetables.

Another objective of the present invention is to provide an artificially intelligent harvest and reuse system for planting vegetables that does not require human resources or a huge area for operation, so as to achieve better efficiency in nursery and harvesting vegetables.

In order to achieve the above objectives, the harvest and reuse system includes at least one first shelf disposed along a first direction with a plurality of layers thereon for nursery vegetables, each layer including a pair of parallel rails disposed along a second direction perpendicular to the first direction and a nursery basin arranged between the pair of parallel rails with a first access opening arranged at an end thereof; at least one second shelf disposed at an opposite side of the first shelf along the first direction with a space left in-between the first and second shelves, the second shelf having a plurality of layers for nursery vegetables, each layer including a pair of parallel rails disposed along the second direction perpendicular to the first direction and a nursery basin arranged between the pair of parallel rails with a second access opening arranged at an end thereof; at least one sliding apparatus including a base disposed on the pair of parallel rails along the first direction with a motor thereon, so as to drive the base sliding on the rails along the second direction, and at least one pair of forks arranged at a front end of the base; a plurality of planting plates disposed on the nursery basins and lining along the second direction, each planting plate having a plurality of planting holes arranged thereon and being displaceable by operation of the sliding apparatus; a first conveyor disposed along the first direction near the first access openings of the first shelf; a second conveyor disposed along the first direction near the second access openings of the second shelf; a connecting conveyor disposed along the second direction and connecting an exit end of the first conveyor and an entry end of the second conveyor, forming an operation line in U shape; a root cutting apparatus disposed at a front end of the connecting conveyor along the second direction and including at least one cutting unit, each of the cutting unit further including a pair of blades operated by a pair of pneumatic cylinders correspondingly to displace back and forth in opposite directions to cut the root of vegetables repeatedly; a packaging apparatus disposed along the second direction at a front end of the root cutting apparatus; a storage area arranged along the second direction at a rear end of the connecting conveyor; a first distributing apparatus disposed on a pair of first rail set to displace between the first and second conveyors along the first direction for operation; a first mechanic arm disposed on the first distributing apparatus to displace together with the first distributing apparatus along the first direction, the first mechanic arm having a first parallel clamp installed at a free end thereof for vertical operation of clamping and releasing for taking away and putting back the planting plates via the first and second access openings; a second mechanic arm disposed between the first conveyor and the root cutting apparatus and having at least one clamp installed at a free end thereof, the clamp arranged in a V shape and operated clamping and releasing horizontally for moving grown vegetables from the planting plates on the first conveyor to the root cutting apparatus; a third mechanic arm disposed at a corner formed by the second conveyor and the storage area and having a second parallel clamp installed at a free end thereof and operated clamping and releasing horizontally for picking up a plurality of nursery foams in the storage area and placing each nursery foam into one of the planting holes individually on the planting plates.

The components and apparatus above are all arranged and disposed at a side of the connecting conveyor, forming an operation loop in a first nursery area, and a controller is disposed near the first nursery area and includes a controlling program and an interface for controlling operation of the apparatus and components.

Whereby the controller holds control of each sliding apparatus on the corresponding layers to displace the planting plates along the second direction for operation and of the first mechanic arm to move the planting plates around the first conveyor, the second conveyor, the first access openings and the second access openings; the planting plates with grown vegetables placed on the first conveyor one by one to be sent toward the connecting conveyor along the first direction; then the second mechanic arm picking up the grown vegetables from the planting plates on the way and delivering to the root cutting apparatus for removing the roots and further sending the cut vegetables to the packaging apparatus for packaging; meanwhile, the planting plates without vegetables being sent to an exit end of the first conveyor in the second direction; the third mechanic arm placing the nursery foams with sprouts onto the planting holes on the empty planting plates individually and then the planting plates further sent back to the corresponding access openings by the second conveyor and the first mechanic arm moved by the first distributing apparatus along the first rail set placing the refilled planting plates onto the corresponding shelves, the refilled planting plates then displaced back onto the corresponding layers by the sliding apparatus, so as to form the artificially intelligent harvest and reuse system for vegetables.

Furthermore, the first and second access openings are slanting from an outside thereof toward an inner side thereof. The base of the sliding apparatus has a pair of first wheels each arranged at a lateral side thereof for the sliding apparatus to be disposed on said pair of parallel rails, and the first wheels are driven by the motor for the base to be displaced along the rails. In a preferred embodiment, the first wheels have a gear structure, each of which has a first gear and a second gear each individually arranged on lateral side thereof, and the parallel rails are further arranged as gear racks for meshing with the gear structure.

The root cutting apparatus includes a plurality of cutting units, each of which has a pair of operating bars engaged with the corresponding pair of blades and controlled by a set of pneumatic cylinders, so that the root cutting apparatus is able to perform cutting on multiple vegetables at the same time.

The clamp of the second mechanic arm has a pneumatic cylinder operating clamping and releasing of a pair of holding pieces, each of said holding pieces has a semicircular section for the holding pieces to form a circle in order to pick up the grown vegetables.

In addition, the planting plates are made of polystyrene.

The present invention further includes a second nursery area arranged at a corresponding side of the first nursery area and sharing the connecting conveyor, root cutting apparatus, the packaging apparatus and the storage area with the first nursery area. The second nursery area includes at least one first shelf, at least one second shelf, at least one sliding apparatus, a plurality of planting plates, a first conveyor and a second conveyor, all of which have the same structure as the ones in the first nursery area; a second distributing apparatus disposed on a pair of second rail set to displace between the first and second conveyors along the first direction for operation; a first mechanic arm disposed on the second distributing apparatus to displace together with the second distributing apparatus along the first direction, said first mechanic arm having a first parallel clamp installed at a free end of the first mechanic arm, said first parallel clamp operated clamping and releasing vertically for taking away and putting back the planting plates via the first and second access openings; and a second mechanic arm and a third mechanic arm arranged with the same structure as the one in the first nursery area.

The second nursery area is also controlled by the controller disposed near the first nursery area for operation of the mentioned apparatus and components in the second nursery area, so as to form an operation loop in the second nursery area symmetrically corresponding to the operation loop in the first nursery area.

With structures disclosed above, the present invention retrieves the planting plates with grown vegetables from the first and second access openings of the layers for further harvesting, root cutting and packaging. Meanwhile, the empty planting plates are sent to be placed with new nursery foams with sprouts thereon and then back to the access openings for another nursery process again. Such automatic operation substantially reduces the human resources and nursery area for growing and harvesting vegetables and provides an intelligent system with a completely safe environment for such operations with better efficiency.

BRIEF DESCRIPTION OF THE DRAWINGS

FIG. 7 is a sectional view taken along line 7-7 of FIG. 6;

FIG. 8B is an enlarged schematic diagram of a first parallel clamp shown in FIG. 6;

FIG. 10A is a schematic diagram illustrating structure of a root cutting apparatus of the present invention;

DETAILED DESCRIPTION OF THE PREFERRED EMBODIMENT

In the following embodiments, the first direction is the X direction marked in the corresponding drawings and the second direction is the Y direction marked in the corresponding drawings.

Figure 1:
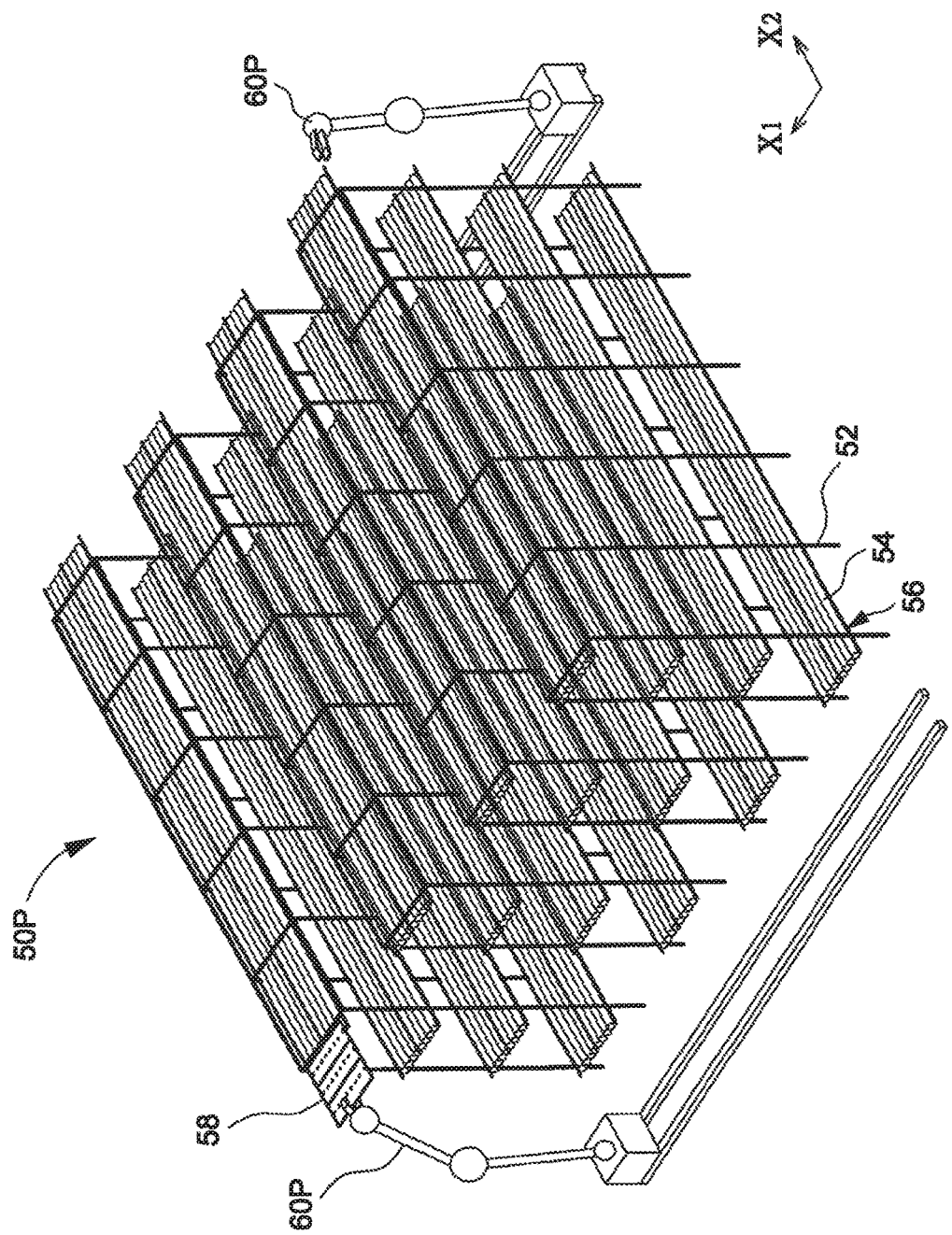
FIG. 1 is a schematic diagram of an automatic harvesting device disclosed in Taiwan Patent No. M520793.
Figure 2:
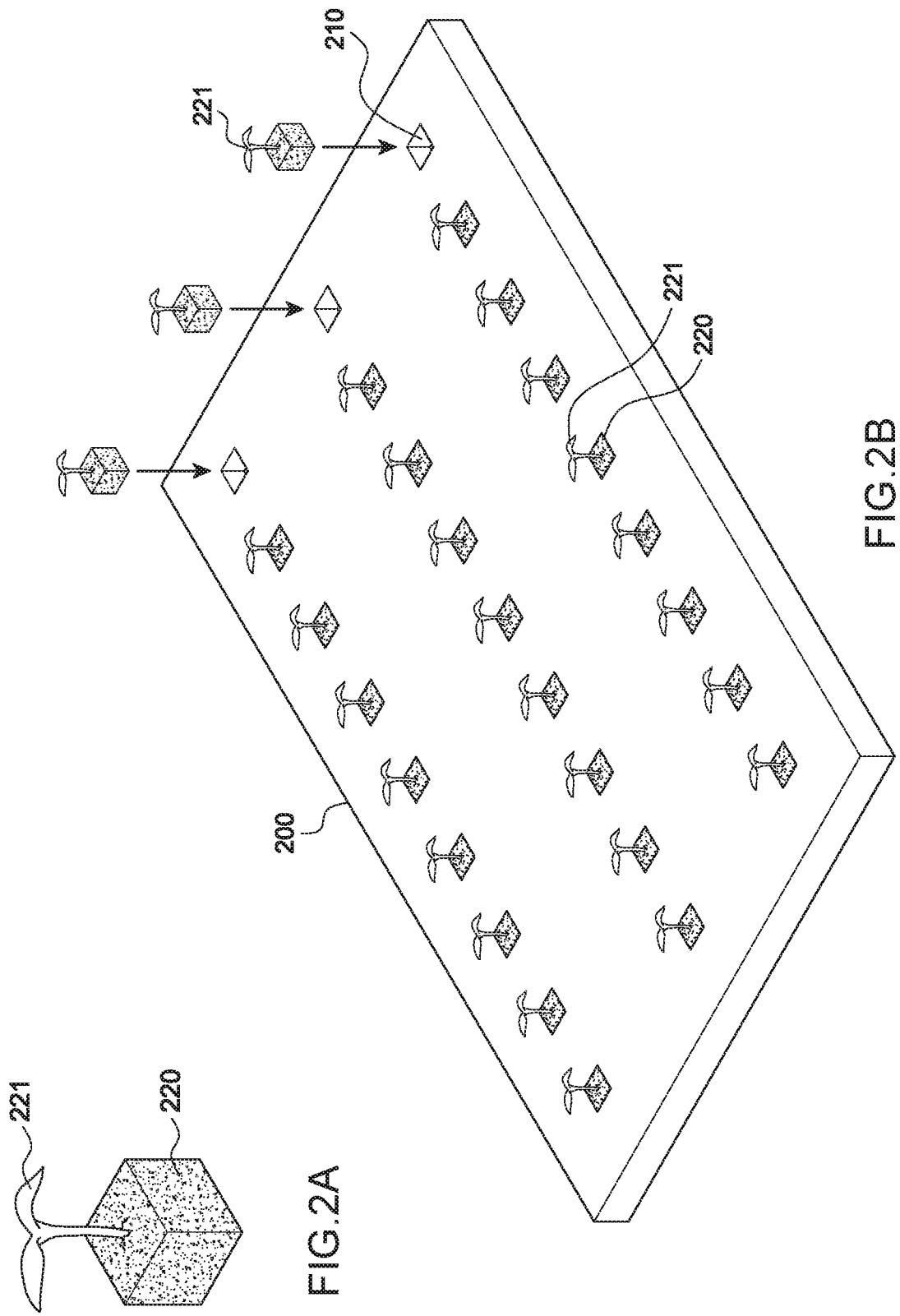
FIG. 2A is a perspective view of a nursery foam with a sprout thereon according to the present invention.
FIG. 2B is a perspective view of a planting plate with a plurality of nursery foams disposed thereon according to the present invention.
Figure 3:
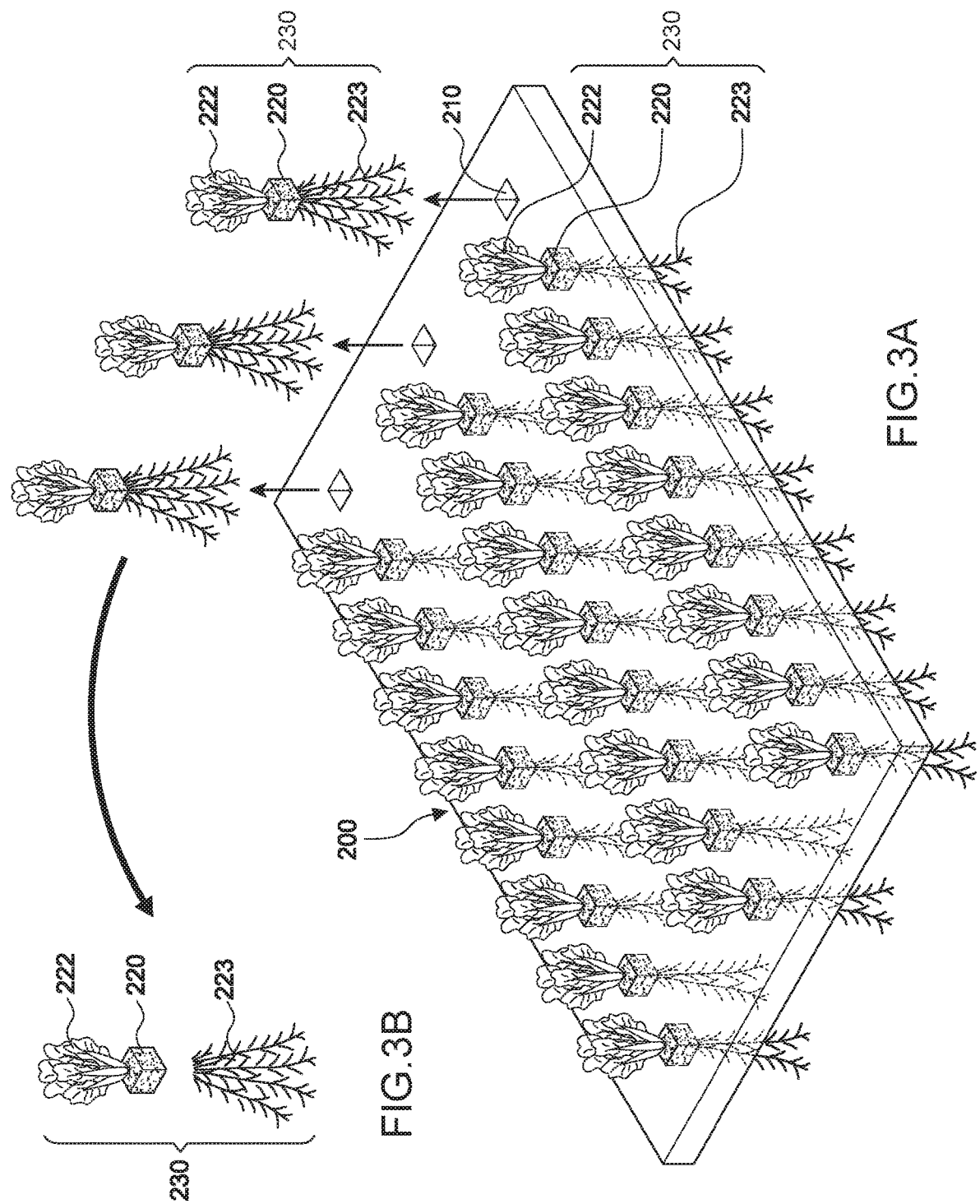
FIG. 3A is a schematic diagram illustrating grown vegetables taken out from the planting holes of the planting plate according to the present invention.
FIG. 3B is a schematic diagram illustrating a root cut from a grown vegetable according to the present invention.

With reference to FIGS. 2A-12, among which FIG. 2A is a perspective view of a nursery foam 220 with a sprout 221 thereon and FIG. 2B shows a plurality of the nursery foams 220 with sprouts 221 placed into corresponding planting holes 210 on a planting plate 200. The shape of the nursery foams 220 are designed to match the shape of the planting holes 210 to be fixed therein appropriately. As for the method of nursery the seeds in the nursery foams 220, any conventional method would apply. FIG. 3A illustrated grown vegetables 230 picked up from the planting holes 210 of the planting plates 200, and FIG. 3B illustrated one of the grown vegetables 230 with its root cut out.

Figure 4:
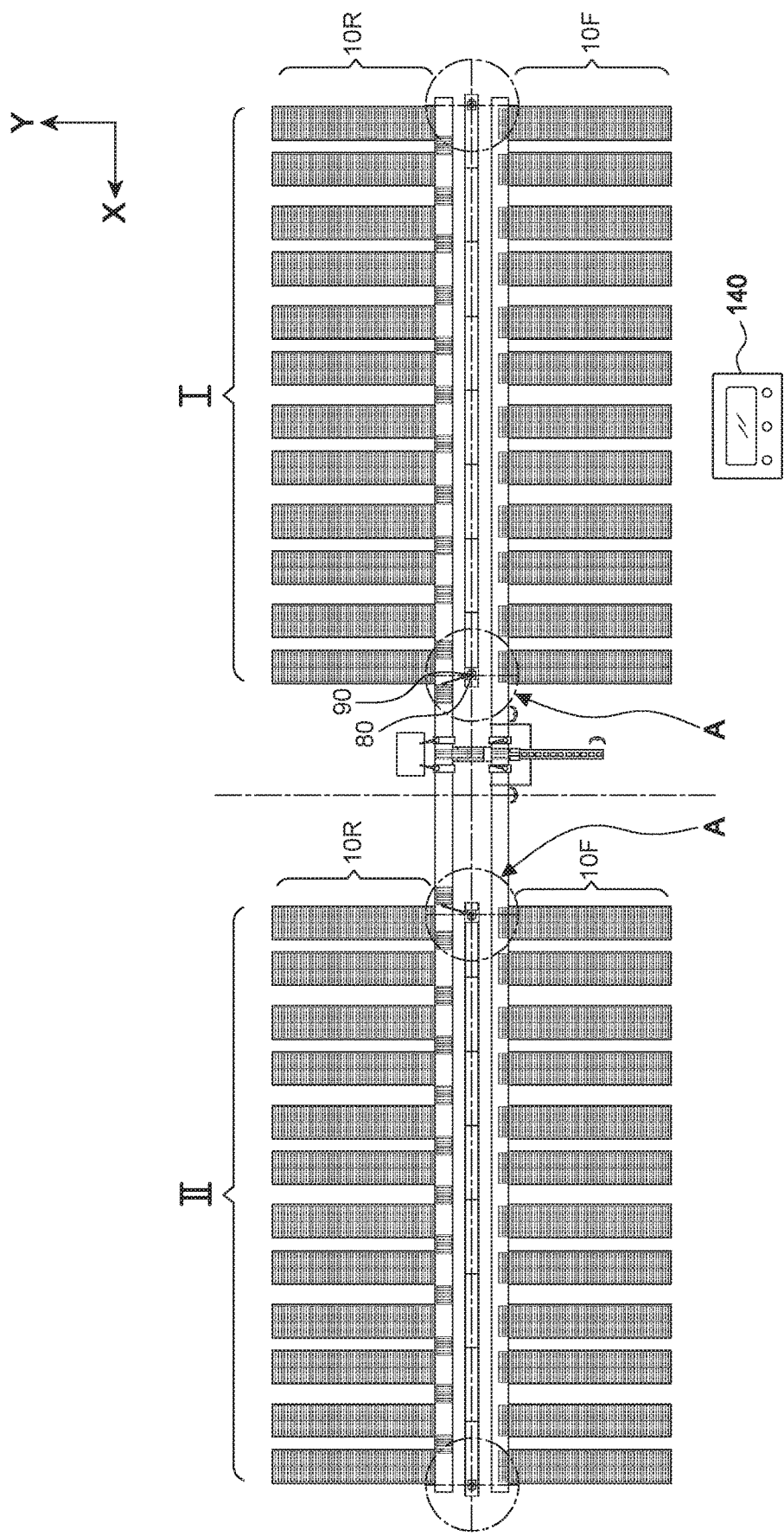
FIG. 4 is a top plan view of the present invention in a preferred embodiment.
Figure 6:
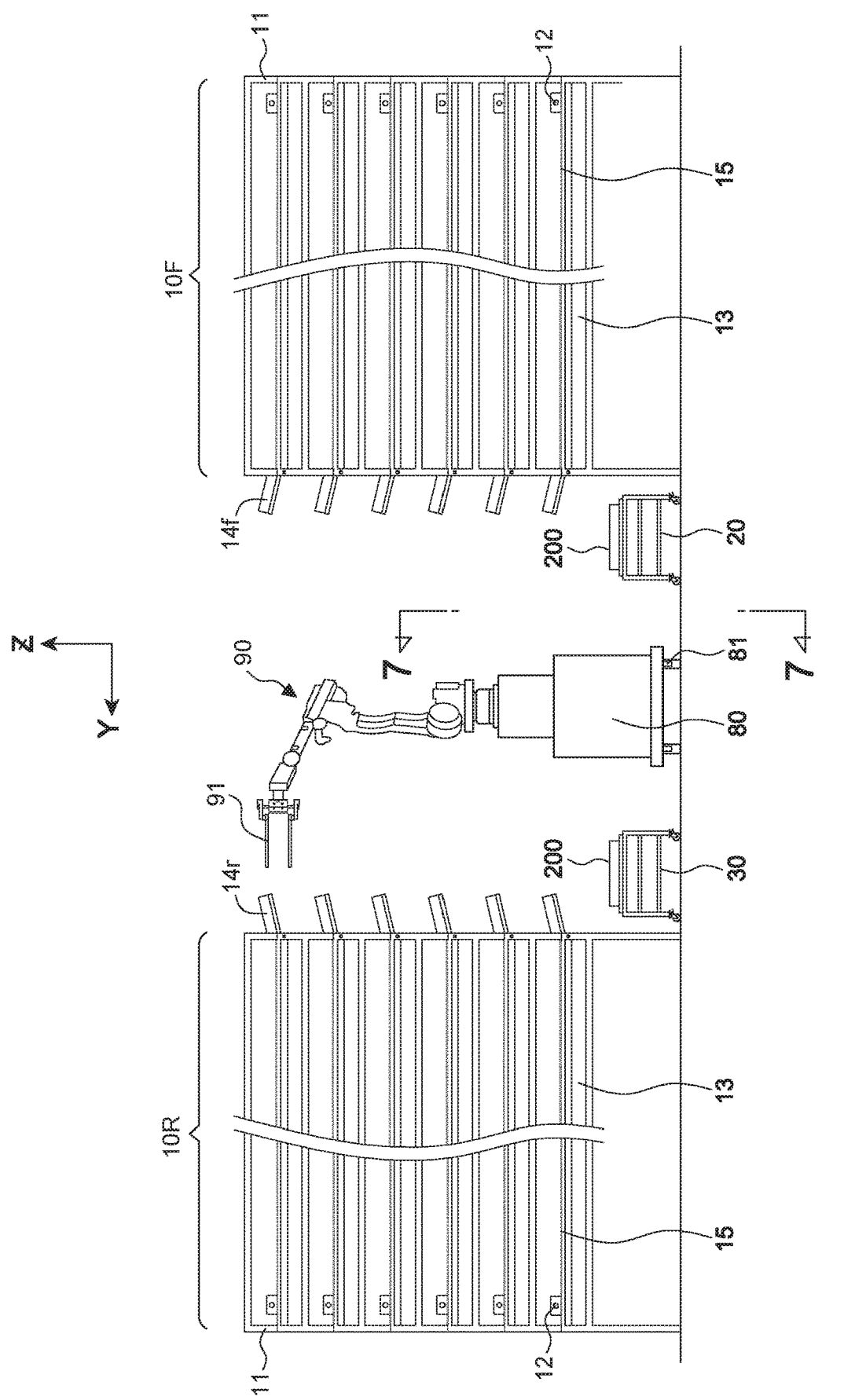
FIG. 6 is a sectional view taken along line 6-6 of FIG. 4.

Basically, the present invention is an automatic operating system for harvesting vegetables and reusing the empty planting plates 200 for another nursery process. After the nursery foams 220 placed into the planting holes 210 as shown in FIG. 2B, the planting plates 200 are sent to a corresponding layer 11 on a corresponding shelf 10F, 10R as shown in FIGS. 4 and 6. When the vegetables are well grown, the planting plates 200 are sent for gathering the grown vegetables 230 together with the nursery foams 220 from the planting plates 200 as shown in FIG. 3A. Conventionally, removing the grown vegetables 230 with the nursery foams 220 and separating the grown vegetables 230 from the nursery foams 220 are proceeded manually; such operation is obviously inefficient. Therefore, the present invention aims to overcome the shortcomings.

The main feature of the present invention is the automatic operation of retrieving, gathering, root cutting and packaging the grown vegetables 230; meanwhile, the empty planting plates 200 are also automatically sent back for placing a new nursery foams 220 thereon and then sent to a corresponding layer 11 of a corresponding shelf 10F, 10R.

In a preferred embodiment, the present invention has at least one first shelf 10F, at least one second shelf 10R, at least one sliding apparatus 12, a plurality of planting plates 200, a first conveyor 20, a second conveyor 30, a connecting conveyor 40, a root cutting apparatus 50, a packaging apparatus 60, a storage area 70, a first distributing apparatus 80, a first mechanic arm 90, a second mechanic arm 100, a third mechanic arm 110 and a controller 140.

The at least one first shelf 10F is disposed along a first direction with a plurality of layers 11 thereon for nursery vegetables, and each layer 11 includes a pair of parallel rails 15 disposed along a second direction perpendicular to the first direction and a nursery basin 13 arranged between the pair of parallel rails 15 with a first access opening 14f arranged at an end thereof.

Figure 12:
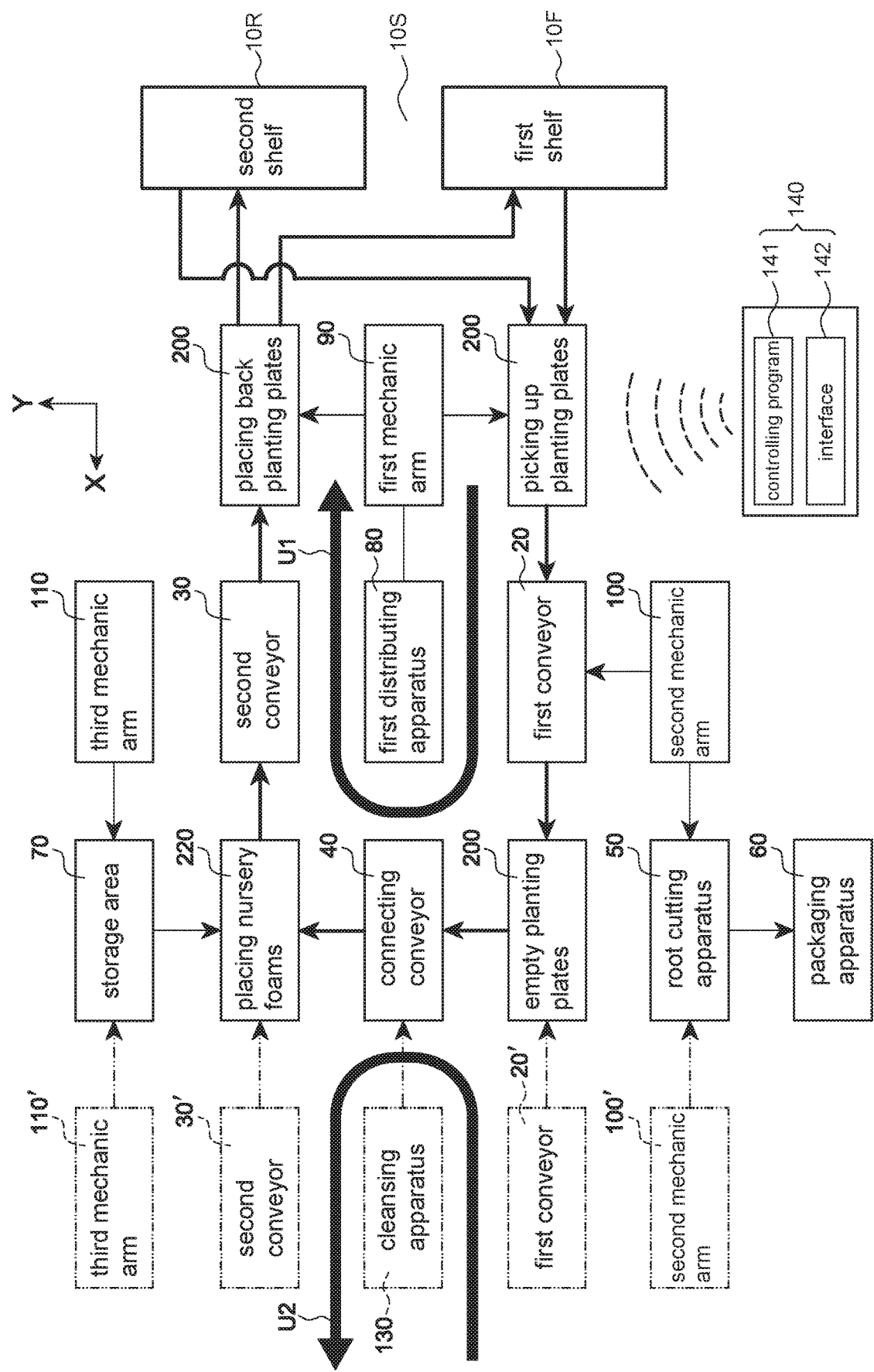
FIG. 12 is a flow diagram showing the automatic procedures of the present invention.

The at least one second shelf 10R is disposed at an opposite side of the first shelf 10F along the first direction with a space 10S left in-between the first and second shelves 10F, 10R. The second shelf 10R has a plurality of layers 11 for nursery vegetables and each layer 11 includes a pair of parallel rails 15 disposed along the second direction perpendicular to the first direction and a nursery basin 13 arranged between the pair of parallel rails 15 with a second access opening 14r arranged at an end thereof as shown in FIGS. 4 and 12. Referring to FIG. 6, the first and second access openings 14f, 14r are slanting from an outside thereof toward an inner side thereof in order to prevent the liquid in the nursery basins 13 from flowing out. In this embodiment, the present invention has 12 first shelf 10F and 12 second shelf 10R, all arranged along the first direction to form a first nursery area I; the numbers of the first and second shelves 10F, 10R can be adjusted as needed.

The at least one sliding apparatus 12 includes a base 121 disposed on the pair of parallel rails 15 along the first direction with a motor 122 thereon, so as to drive the base 121 sliding on the rails 15 along the second direction, and at least one pair of forks 123 is arranged at a front end of the base 121. In this embodiment, the base 121 has a pair of first wheels 124 each arranged at a lateral side of the base 121 for the sliding apparatus 12 to be disposed on the corresponding pair of parallel rails 15, and the first wheels 124 are driven by the motor 122 for the base 121 to be displaced along the rails 15. Furthermore, the pair of first wheels 124 has a gear structure with each wheel having a first gear 125 and a second gear 126, each of which individually arranged on a lateral side of the corresponding first wheel 124; and the parallel rails 15 are further arranged as gear racks for meshing with the gear structure.

Figure 8A:
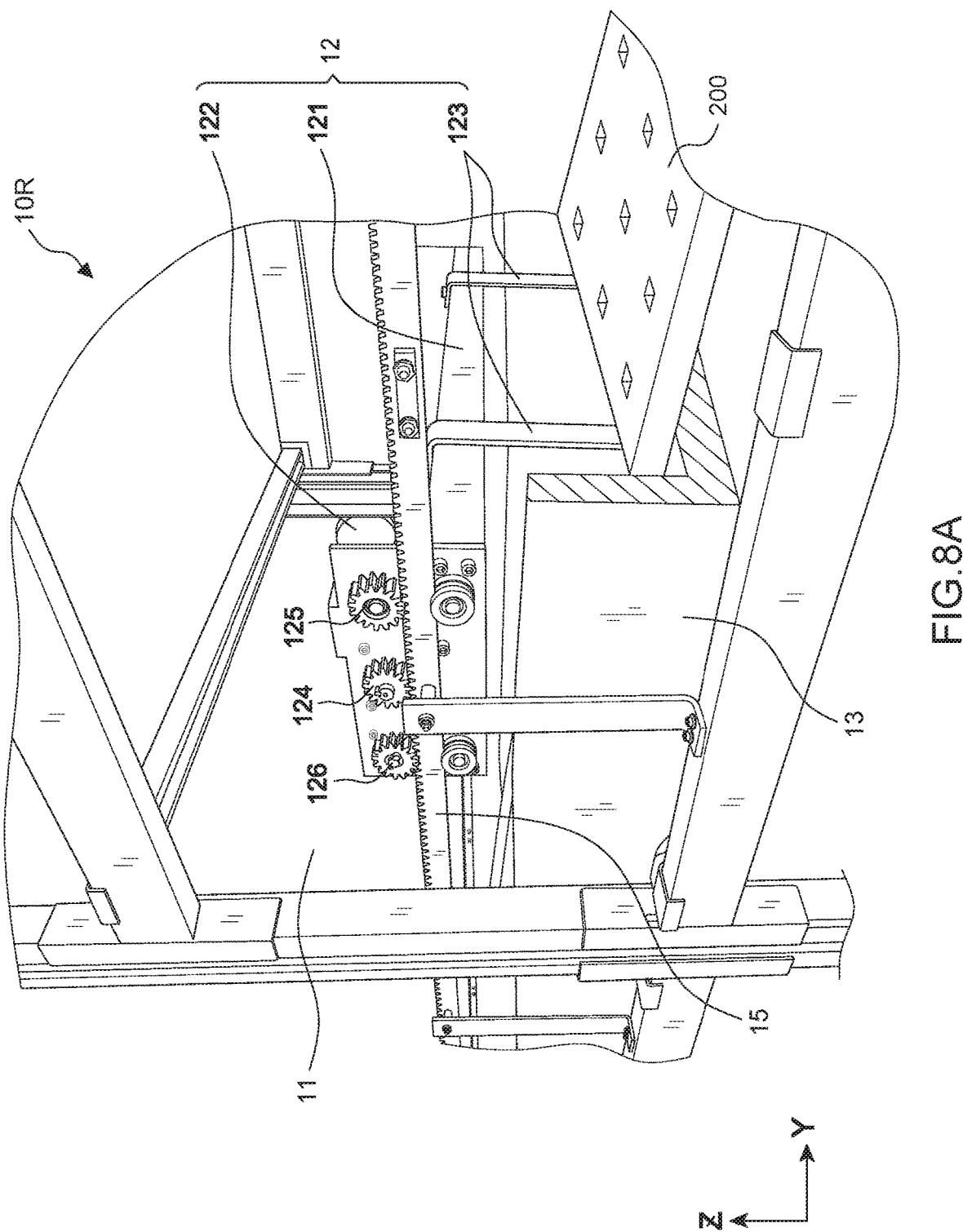
FIG. 8A is a schematic diagram illustrating structure of a layer for vegetable nursery according to the present invention.

Referring to FIGS. 6 and 8A, the plurality of planting plates 200 is disposed on the nursery basins 13 and lining along the second direction and each planting plate 200 is being displaceable by operation of the forks 123 of the sliding apparatus 12 and has a plurality of planting holes 210 arranged thereon. In this embodiment, the planting plates 200 are made of polystyrene.

The first conveyor 20 is disposed along the first direction near the first access openings 14f of the first shelf 10F. The second conveyor 30 is disposed along the first direction near the second access openings 14r of the second shelf 10R. In this embodiment, the first and second conveyors 20, 30 are normal belt conveyors, or they can be conveyors having similar design with the belt conveyors for transferring the vegetables.

The connecting conveyor 40 is disposed along the second direction and connecting an exit end of the first conveyor 20 and an entry end of the second conveyor 30, forming an operation line in U shape, so that the empty planting plates 200 can be sent to the second conveyor 30 by the connecting conveyor 40 for placing new nursery foams 220 with sprouts 221 again.

Figure 10B:
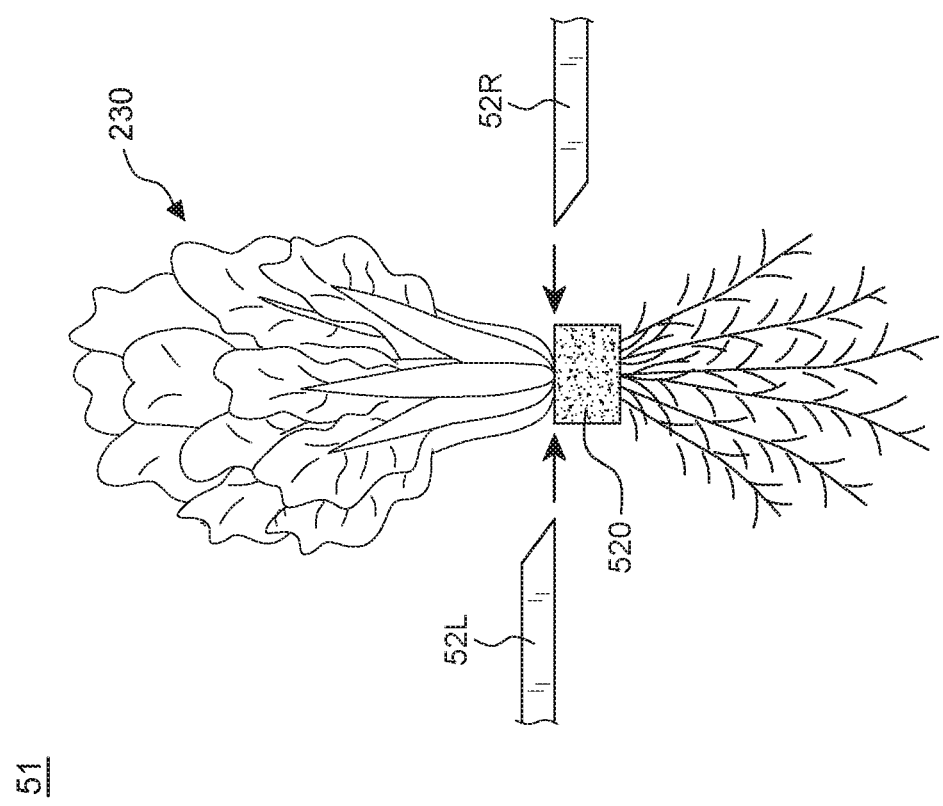
FIG. 10B is a schematic diagram illustrating a root of a vegetable being cut by the root cutting apparatus.

The root cutting apparatus 50 is disposed at a front end of the connecting conveyor 40 along the second direction. In this embodiment, the root cutting apparatus 50 includes at least one cutting unit 51 as shown in FIG. 10A. Each cutting unit 51 includes a pair of blades 52L, 52R operated by a pair set of pneumatic cylinders or cylinders with the same function 53L, 53R correspondingly to displace back and forth in opposite directions for cutting the roots 223 of vegetables repeatedly as shown in FIG. 10B. In the embodiment, the root cutting apparatus 50 includes 3 cutting units 51 as a set, each of which has a pair of operating bars 54L, 54R engaged with the corresponding pair of blades 52L, 52R and controlled by the corresponding pneumatic cylinders 53L, 53R, so that the root cutting apparatus 50 is able to perform cutting on multiple vegetables at the same time.

The packaging apparatus 60 is disposed along the second direction at a front end of the root cutting apparatus 50 for further packaging the cut vegetables 222.

The storage area 70 is arranged along the second direction at a rear end of the connecting conveyor 40. In the storage area 70 a plurality of nursery foams 220 are neatly arranged for short-term storage, each of which has a sprout 221 therein as shown in FIG. 2A.

The first distributing apparatus 80 is disposed on a pair of first rail set 81 to displace between the first and second conveyors 20, 30 along the first direction for operation. In this embodiment, the first distributing apparatus 80 is driven by a motor (not shown) for displacing along the first rail set 81 as shown in FIG. 7.

The first mechanic arm 90 is disposed on the first distributing apparatus 80 to displace together with the first distributing apparatus 80 along the first direction. With reference to FIG. 8B, the first mechanic arm 90 has a first parallel clamp 91 installed at a free end of the first mechanic arm 90 for vertical operation in taking away and putting back the planting plates 200 via the first and second access openings 14f, 14r; the first parallel clamp 91 has a set of holding pieces 912 to be operated by a pneumatic cylinder 911 or other cylinders with similar function. The operation area of the first mechanic arm 90 is illustrated as an area A in FIGS. 4 and 5. Within the area A, the first parallel clamp 91 of the first mechanic arm 90 is operated to take away the planting plates 200 from the first access openings 14f and to send them back via the second access openings 14r.

Figure 5:
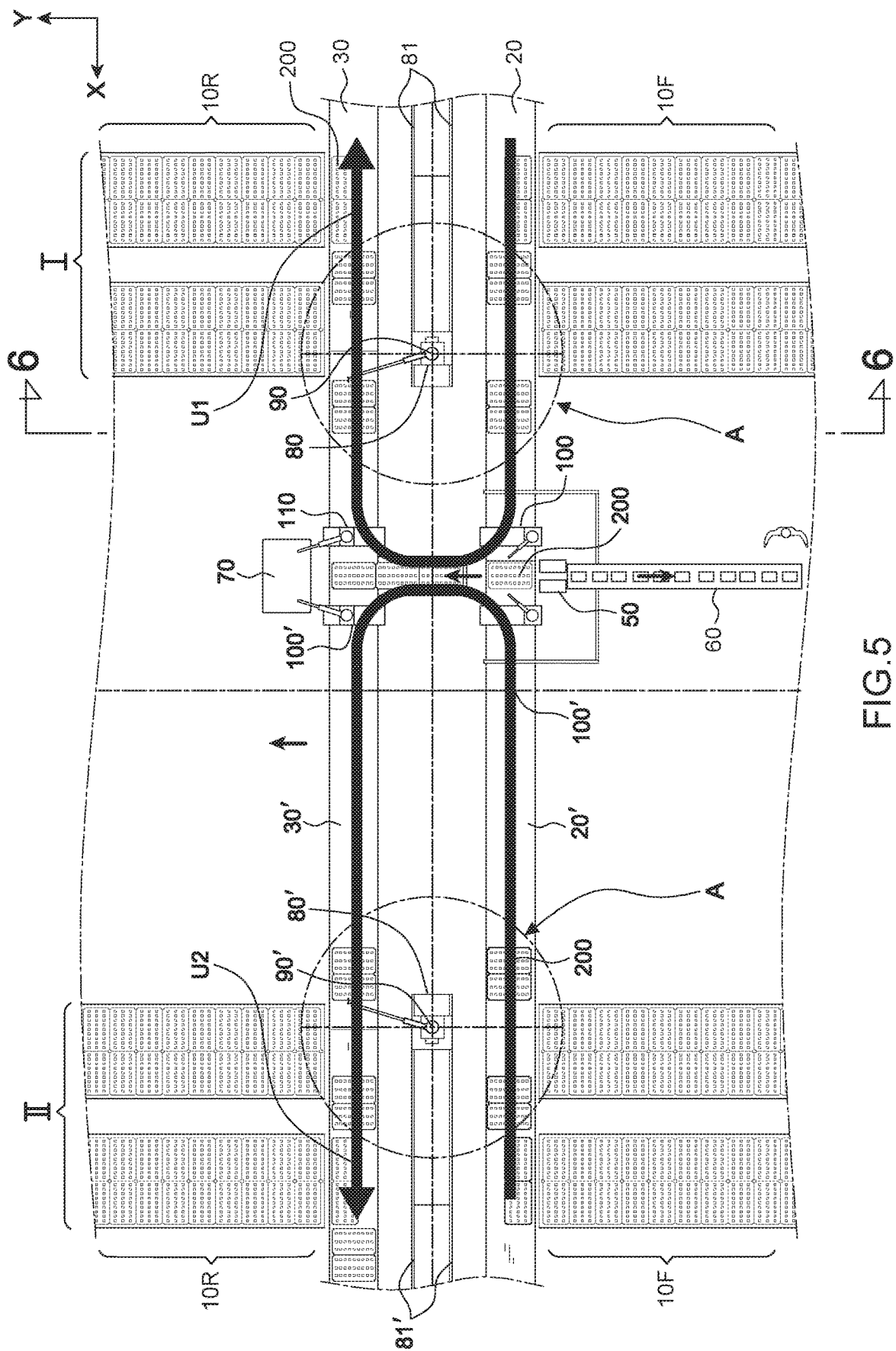
FIG. 5 is an enlarged view of partial structure of FIG. 4.
Figure 9A:
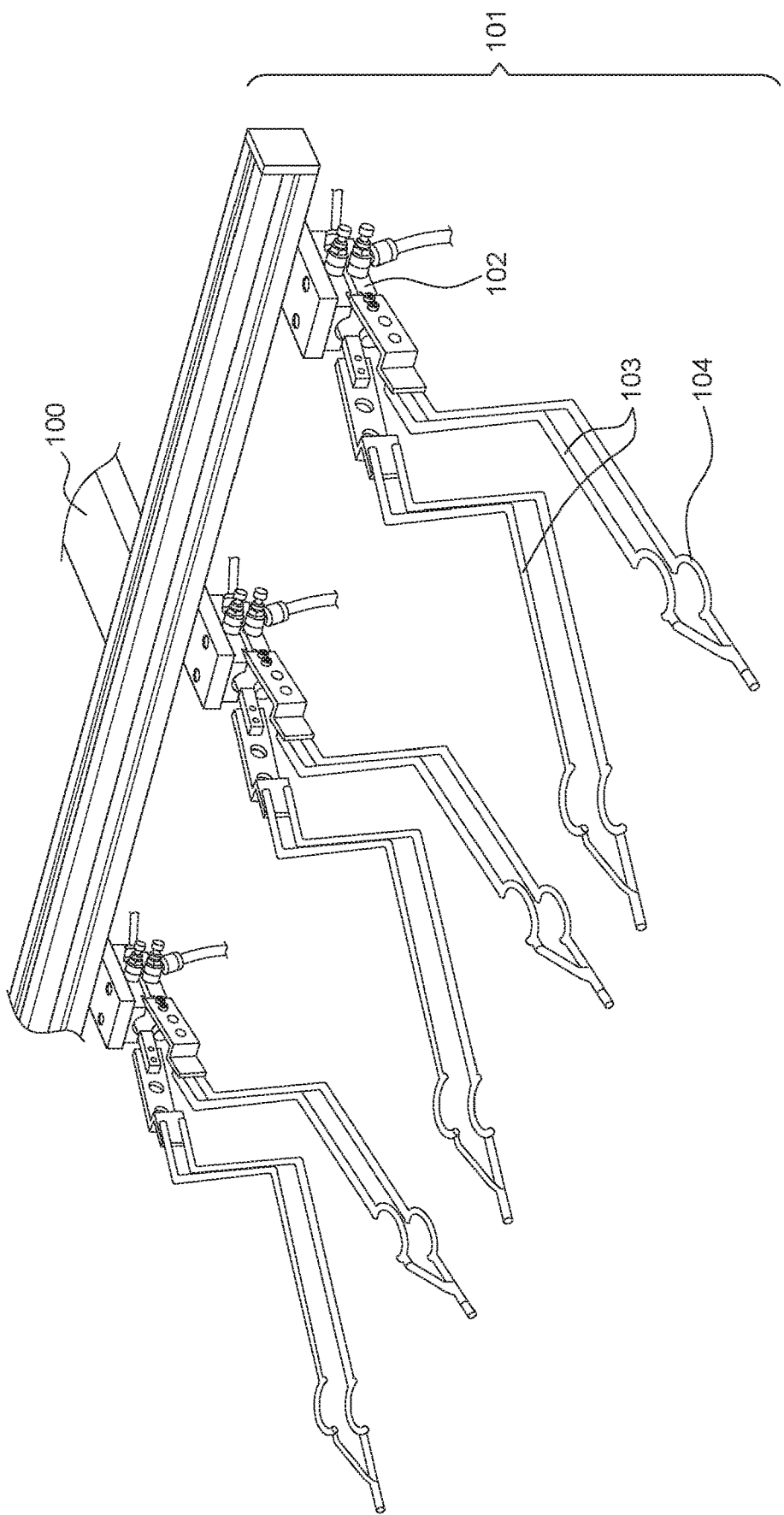
FIG. 9A is a schematic diagram illustrating a set of clamps operated to be ready for picking up vegetables.
Figure 9B:
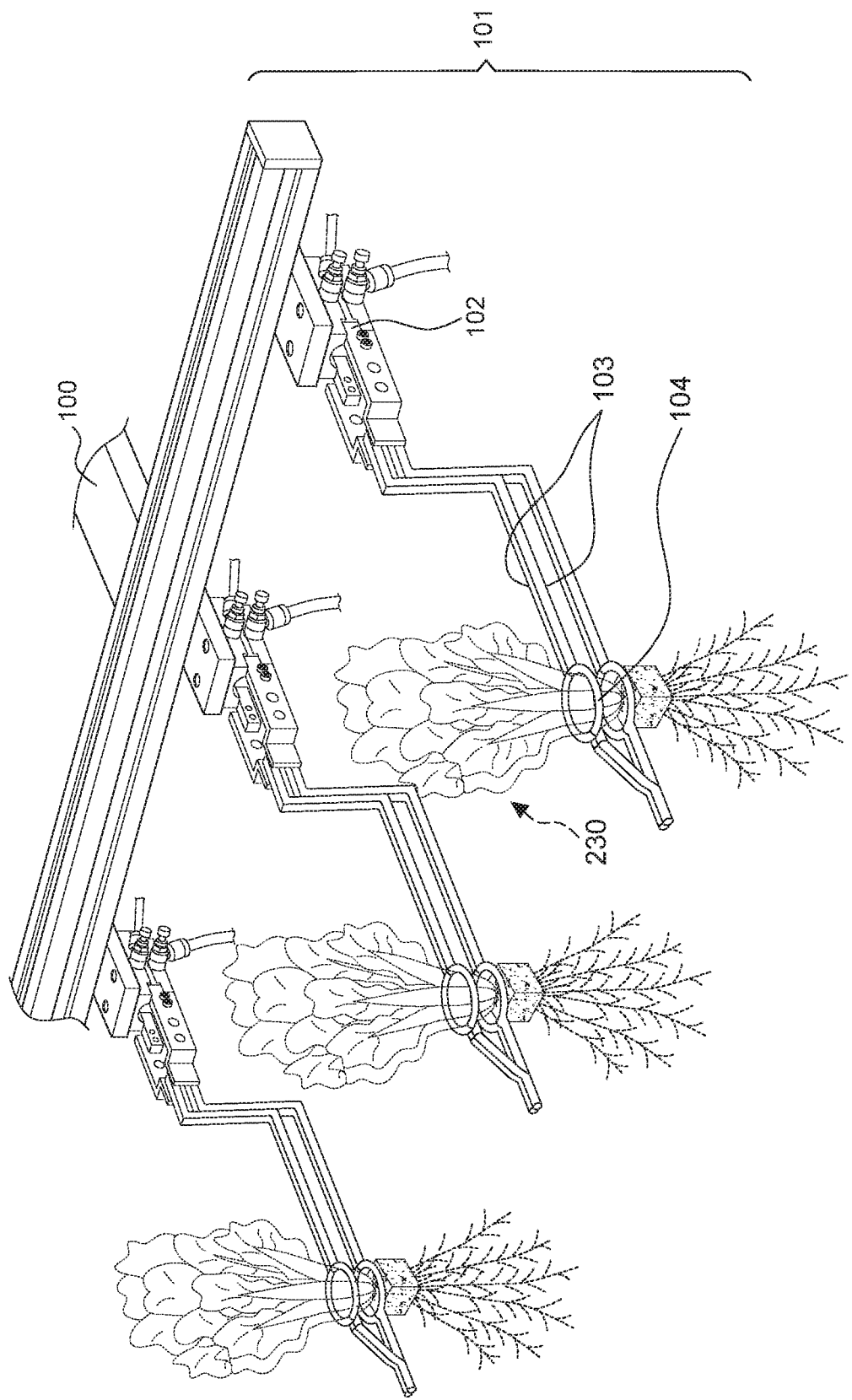
FIG. 9B is a schematic diagram illustrating the set of clamps operated to pick up vegetables.
Figure 11:
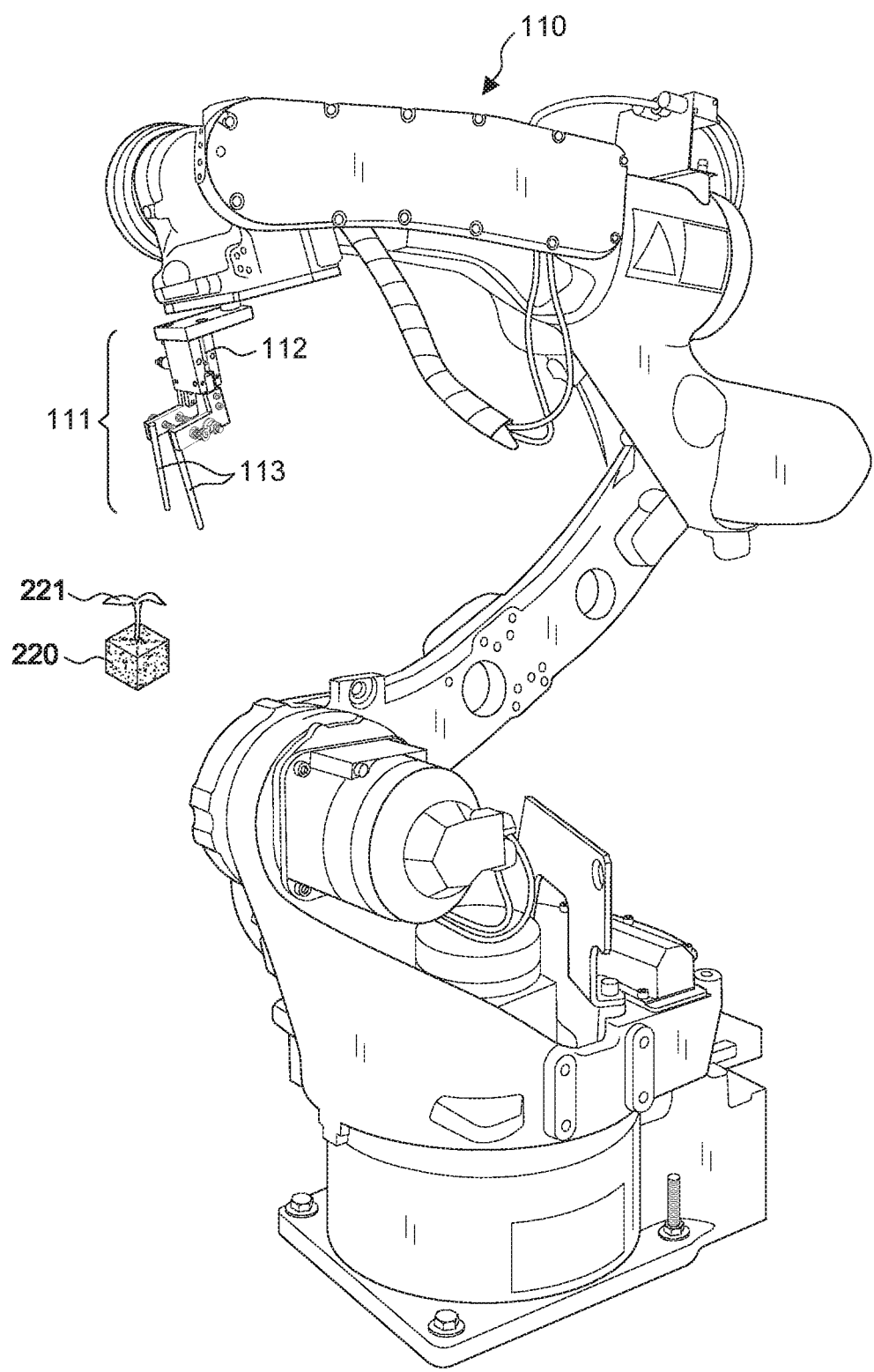
FIG. 11 is a perspective of a third mechanic arm of the present invention.

Referring to FIGS. 5 and 12, the second mechanic arm 100 is disposed between the first conveyor 20 and the root cutting apparatus 50 and has a structure illustrated in FIG. 11. A free end of the second mechanic arm 100 has at least one clamp 101 installed thereon, and the clamp 101 is arranged in a V shape and operated clamping and releasing horizontally for moving grown vegetables 230 from the planting plates 200 on the first conveyor 20 to the root cutting apparatus 50 for cutting the roots 223 from the grown vegetables 230 as illustrated in FIGS. 9A and 9B. In the embodiment, the clamp 101 has a pneumatic cylinder 102 operating clamping and releasing of a pair of holding pieces 102, 103 as each of the holding pieces 102, 103 has a semicircular section to form a circle in order to pick up the grown vegetables 230.

Referring to FIGS. 5, 11 and 12, the third mechanic arm 110 is disposed at a corner formed by the second conveyor 30 and the storage area 70 and has a second parallel clamp 111 installed at a free end thereof. The second parallel clamp 111 has a pair of holding rods 113 operated by a pneumatic cylinder 112 for clamping and releasing horizontally, so as to pick up the nursery foams 220 in the storage area and place each nursery foam 220 into one of the planting holes 210 individually on the planting plates 200 as shown in FIG. 2B.

The components and apparatus mentioned above are all arranged and disposed at a side of the connecting conveyor 50, forming an operation loop in a first nursery area I as shown in FIGS. 4 and 12. And a controller 140 is disposed near the first nursery area I and includes a controlling program 141 and an interface 142 for controlling the operation of the apparatus and components. In this embodiment, the controller 140 is electrically connected to the components and apparatus by cables or via wireless internet.

Whereby the controller 140 holds control of each sliding apparatus 12 on the corresponding layers 11 to displace the planting plates 200 along the second direction for operation and of the first mechanic arm 90 to move the planting plates 200 around the first conveyor 20, the second conveyor 30, the first access openings 14f and the second access openings 14r. The planting plates 200 with grown vegetables 230 are placed on the first conveyor 20 one by one to be sent toward the connecting conveyor 40 along the first direction; then the second mechanic arm 100 picks up the grown vegetables 230 from the planting plates 200 on the way and delivers to the root cutting apparatus 50 for removing the roots 223, and further sends the cut vegetables 222 to the packaging apparatus 60 for packaging.

Meanwhile, the planting plates 200 without vegetables are sent to an exit end of the first conveyor 20 in the second direction. The third mechanic arm 110 places the nursery foams 220 with sprouts 221 onto the planting holes 200 on the empty planting plates 200 individually and then the planting plates 200 are further sent back to the corresponding access openings 14f, 14r by the second conveyor 30 and the first mechanic arm 90 moved by the first distributing apparatus 80 along the first rail set 81 places the refilled planting plates 200 onto the corresponding shelves 10F, 10R. The refilled planting plates 200 are then displaced back onto the corresponding layers 11 by the sliding apparatus 12, so as to form the artificially intelligent harvest and reuse system for vegetables as shown in FIG. 8.

In this embodiment, the connecting conveyor 40 further includes a cleansing apparatus 130 for cleansing the empty planting plates 200 before placing new nursery foams 220 thereon as shown in FIG. 12.

In another applicable embodiment, the present invention further includes a second nursery area II arranged at a corresponding side of the first nursery area I and sharing the connecting conveyor 40, the root cutting apparatus 50, the packaging apparatus 60 and the storage area 70 with the first nursery area I.

Moreover, the second nursery area II has exactly the same structure and apparatus as the first nursery area I, except that a second distributing apparatus 80' is disposed on a pair of second rail set 81' to displace between the first and second conveyors 20', 30' along the first direction for operation, that a first mechanic arm 90' is disposed on the second distributing apparatus 80' to displace together with the second distributing apparatus 80' along the first direction; the first mechanic arm 90' has a first parallel clamp 91 installed at a free end thereof for vertical operation in taking away and putting back the planting plates 200 via the first and second access openings 14f, 14r; the first parallel clamp 91 has a set of holding pieces 912 to be operated by a pneumatic cylinder 911 or other cylinders with similar function.

The second nursery area II is further controlled by the controller 140 disposed near the first nursery area I for operation of the apparatus and components in the second nursery area II, so as to form an operation loop within the second nursery area II symmetrically corresponding to the operation loop in the first nursery area I. Such arrangement is able to further increase the efficiency of the harvest and reuse system in view of both space and the equipment.

To sum up, the present invention retrieves grown vegetables from the layers of the first and second shelves, and then gathers the vegetables for sending to further root cutting and packaging process. Meanwhile, the empty planting plates are sent for refilling new nursery foams with sprouts again and the refilled planting plates are further sent back to the layers of the first and second shelves. Such operation is completely automatic for harvesting and restarting the vegetables nursery process, featuring less human resources, less operation area, more flexibility in 3-dimensional operations, intelligent operations and highly secure environment for growing vegetables.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An artificially intelligent harvest and reuse system for planting vegetables, comprising:
at least one first shelf disposed along a first direction with a plurality of layers thereon for nursery vegetables, each layer including a pair of parallel rails disposed along a second direction perpendicular to said first direction and a nursery basin arranged between said pair of parallel rails with a first access opening arranged at an end thereof;
at least one second shelf disposed at an opposite side of said first shelf along said first direction with a space left in-between said first and second shelves, said second shelf having a plurality of layers for nursery vegetables, each layer including a pair of parallel rails disposed along said second direction perpendicular to said first direction and a nursery basin arranged between said pair of parallel rails with a second access opening arranged at an end thereof;

at least one sliding apparatus including a base disposed on said pair of parallel rails along the first direction with a motor thereon, so as to drive said base sliding on said rails along the second direction, and at least one pair of forks arranged at a front end of said base;

a plurality of planting plates disposed on said nursery basins and lining along the second direction, each planting plate having a plurality of planting holes arranged thereon and being displaceable by operation of the sliding apparatus;

a first conveyor disposed along the first direction near the first access openings of the first shelf;

a second conveyor disposed along the first direction near the second access openings of the second shelf;

a connecting conveyor disposed along the second direction and connecting an exit end of the first conveyor and an entry end of the second conveyor, forming an operation line in U shape;

a root cutting apparatus disposed at a front end of the connecting conveyor along the second direction and including at least one cutting unit, each of said cutting unit further including a pair of blades operated by a pair of pneumatic cylinders correspondingly to displace back and forth in opposite directions to cut the root of vegetables repeatedly;

a packaging apparatus disposed along the second direction at a front end of the root cutting apparatus;

a storage area arranged along the second direction at a rear end of the connecting conveyor;

a first distributing apparatus disposed on a pair of first rail set to displace between the first and second conveyors along the first direction for operation;

a first mechanic arm disposed on the first distributing apparatus to displace together with the first distributing apparatus along the first direction, said first mechanic arm having a first parallel clamp installed at a free end thereof for vertical operation of clamping and releasing for taking away and putting back the planting plates via the first and second access openings;

a second mechanic arm disposed between the first conveyor and the root cutting apparatus and having at least one clamp installed at a free end thereof, said clamp arranged in a V shape and operated clamping and releasing horizontally for moving grown vegetables from the planting plates on the first conveyor to the root cutting apparatus;

a third mechanic arm disposed at a corner formed by the second conveyor and the storage area and having a second parallel clamp installed at a free end thereof and operated clamping and releasing horizontally for picking up a plurality of nursery foams in the storage area and placing each nursery foam into one of the planting holes individually on the planting plates;

said components and apparatus being arranged and disposed at a side of the connecting conveyor, forming an operation loop in a first nursery area; and a controller disposed near the first nursery area and including a controlling program and an interface for controlling operation of said apparatus and components;

whereby the controller holds control of each sliding apparatus on the corresponding layers to displace the planting plates along the second direction for operation and of the first mechanic arm to move the planting plates around the first conveyor, the second conveyor, the first access openings and the second access openings; the planting plates with grown vegetables placed on the first conveyor one by one to be sent toward the connecting conveyor along the first direction; then the second mechanic arm picking up the grown vegetables from the planting plates on the way and delivering to the root cutting apparatus for removing the roots and further sending the cut vegetables to the packaging apparatus for packaging; meanwhile, the planting plates without vegetables being sent to an exit end of the first conveyor in the second direction; the third mechanic arm placing the nursery foams with sprouts onto the planting holes on the empty planting plates individually and then the planting plates further sent back to the corresponding access openings by the second conveyor and the first mechanic arm moved by the first distributing apparatus along the first rail set placing the refilled planting plates onto the corresponding shelves, the refilled planting plates then displaced back onto the corresponding layers by the sliding apparatus, so as to form the artificially intelligent harvest and reuse system for vegetables.

2. The artificially intelligent harvest and reuse system for planting vegetables as claimed in claim 1, wherein the first and second access openings are slanting from an outside thereof toward an inner side thereof.

3. The artificially intelligent harvest and reuse system for planting vegetables as claimed in claim 1, wherein the base of the sliding apparatus has a pair of first wheels each arranged at a lateral side thereof for the sliding apparatus to be disposed on said pair of parallel rails, said first wheels driven by the motor for the base to be displaced along the rails.

4. The artificially intelligent harvest and reuse system for planting vegetables as claimed in claim 3, wherein the pair of first wheels has a gear structure with each wheel having a first gear and a second gear, each individually arranged on a lateral side of said corresponding first wheel and the parallel rails are further arranged as gear racks for meshing with the gear structure.

5. The artificially intelligent harvest and reuse system for planting vegetables as claimed in claim 1, wherein the root cutting apparatus includes a plurality of cutting units, each of which has a pair of operating bars engaged with the corresponding pair of blades and controlled by a set of pneumatic cylinders, so that the root cutting apparatus is able to perform cutting on multiple vegetables at the same time.

6. The artificially intelligent harvest and reuse system for planting vegetables as claimed in claim 1, wherein the clamp of the second mechanic arm has a pneumatic cylinder operating clamping and releasing of a pair of holding pieces, each of said holding pieces has a semicircular section for the holding pieces to form a circle in order to pick up the grown vegetables.

7. The artificially intelligent harvest and reuse system for planting vegetables as claimed in claim 1, wherein the planting plates are made of polystyrene.

8. The artificially intelligent harvest and reuse system for planting vegetables as claimed in claim 1, wherein the present invention further includes a second nursery area arranged at a corresponding side of the first nursery area and sharing the connecting conveyor, root cutting apparatus, the packaging apparatus and the storage area with the first nursery area, said second nursery area including:

at least one first shelf arranged with the same structure as the one in the first nursery area;

at least one second shelf arranged with the same structure as the one in the first nursery area;
at least one sliding apparatus arranged with the same structure as the one in the first nursery area;
a plurality of planting plates arranged with the same structure as the one in the first nursery area;
a first conveyor arranged with the same structure as the one in the first nursery area;
a second conveyor arranged with the same structure as the one in the first nursery area;
a second distributing apparatus disposed on a pair of second rail set to displace between the first and second conveyors along the first direction for operation;
a first mechanic arm disposed on the second distributing apparatus to displace together with the second distributing apparatus along the first direction, said first mechanic arm having a first parallel clamp installed at a free end of the first mechanic arm, said first parallel clamp operated clamping and releasing vertically for taking away and putting back the planting plates via the first and second access openings;
a second mechanic arm arranged with the same structure as the one in the first nursery area; and
a third mechanic arm arranged with the same structure as the one in the first nursery area;
said second nursery area further controlled by said controller disposed near the first nursery area for operation of said apparatus and components in said second nursery area, so as to form an operation loop in said second nursery area symmetrically corresponding to the operation loop in the first nursery area.

\* \* \* \* \*